(12) United States Patent
Fujiwara

(10) Patent No.: US 6,647,263 B2
(45) Date of Patent: *Nov. 11, 2003

(54) AUTOMATIC CALL MAKING SYSTEM AND A MOBILE RADIO TERMINAL

(75) Inventor: Ryuhei Fujiwara, Tokyo (JP)

(73) Assignee: NEC Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,446

(22) Filed: May 14, 1999

(65) Prior Publication Data

US 2002/0151277 A1 Oct. 17, 2002

(30) Foreign Application Priority Data

May 15, 1998 (JP) .......................... 10-133724

(51) Int. Cl.[7] ............................... H04Q 7/20
(52) U.S. Cl. ...................... 455/437; 455/525
(58) Field of Search ............... 455/436, 437, 455/440, 524, 525; 370/331, 332

(56) References Cited

U.S. PATENT DOCUMENTS 5,212,806 A * 5/1993 Natarajan
5,257,406 A * 10/1993 Ito ........................ 455/445
5,722,072 A * 2/1998 Crichton et al.

FOREIGN PATENT DOCUMENTS

| JP | 62-160829 | 7/1987 |
|---|---|---|
| JP | 3-131131 | 6/1991 |
| JP | 4-290098 | 10/1992 |
| JP | 5-276101 | 10/1993 |
| JP | 9-219697 | 8/1997 |
| JP | 9-289679 | 11/1997 |
| JP | 10-200946 | 7/1998 |

OTHER PUBLICATIONS

Japanese Office Action issued Feb. 1, 2000 in a related application with English translation of relevant portions.

* cited by examiner

Primary Examiner—Nguyen T. Vo
(74) Attorney, Agent, or Firm—Dickstein, Shapiro, Morin & Oshinsky, LLP.

(57) ABSTRACT

A radio wave from a base station, which is received in a radio unit (TRX) 2 of a terminal, contains an identification signal of the base station. A base station identification signal detecting unit 3 detects the base station, from which the radio wave is received, and the CPU 5 makes a judgment. The input level of the received radio wave and the time can be known from an electric field intensity measuring unit 4 and a clock 7, respectively. The terminal has a table, in which times and places meeting communication conditions are registered. A communication time is predicted from the data quantity to be transmitted, and the time and place of the connection trial start are selected. A link is set up periodically at a time and a place meeting conditions, which are determined with reference to the table, thus permitting automatic exchange of data, if any, to the terminal or link destination.

6 Claims, 4 Drawing Sheets

|   | BASE STATION #A | BASE STATION #B | BASE STATION #C |
|---|---|---|---|
| 1 | 8:00-8:10 | 8:20-8:22 | 8:30-8:40 |
| 2 | 18:30-18:20 | 18:10-18:08 | 18:00-17:50 |
| 3 | | | |

AUTOMATIC CALL MAKING SYSTEM AND A MOBILE RADIO TERMINAL

BACKGROUND OF THE INVENTION

The present invention relates to radio data communication systems and, more particularly, to a method of reconnecting a line after occurrence of a disconnection or an open line due to radio wave interruption during communication.

With recent development of communication middle wear and the like, it has become possible to cover the reliability concerning the occurrence of open lines due to radio wave interruption during communication in radio data communication by confirming the transmission with buffers provided on both the data transmitting and receiving sides. However, the operation of re-raising (i.e., reconnecting) an open line should be performed on the basis of circumstance judgment made by a person with experience.

When an open line occurs due to radio wave interruption during communication in a bad radio circumstance condition place, it is highly possible to fail in connection in a reconnection trial or, although connection may be obtained, an open line will occur again. In such cases, it is necessary to postpone the reconnection trial until the condition becomes good. The operation of reconnection has many problems. It must be manually performed by a person whenever a disconnection of a line or an open line occurs, regardless of whether the data communication will fail, and accordingly, multiple attempts at reconnection may be required. Automation of the reconnection process thus has been demanded.

SUMMARY OF THE INVENTION

The present invention was made in view of the above problem, and its object is to provide system or method for automatically making the reconnection of an open line occurring during communication in mobile communication and also making condition judgment for the reconnection.

The present invention features adopting a system in radio data communication, in which radio terminals statistically learn the circumstances of the radio communication line and makes an automatic call when predetermined conditions are met.

According to an aspect of the present invention, there is provided an automatic call making system comprising: a plurality of base stations each having a specific identification number and having a cellular structure for transmitting signal in a waiting control channel; and a radio terminal having means for receiving radio waves transmitted from the base stations, a clock, an input electric field intensity level detecting means or a BER detecting means and a means for detecting a base station identification signal, and having a function of tentatively storing data to be transmitted and a function of resuming and continuing communication by automatically doing a line connecting process (call making) when stored data is present; wherein the terminal measures a receiving time, during which stable radio wave reception is possible, for each base station identification signal, stores these times as statistically stable receiving times, and makes a call to a base station on the basis of the pertinent statistically stable receiving time.

The statistically stable receiving times are obtained by measuring a time, during which the average input electric field intensity level is above a predetermined value, or a time, the average value of the BERs is below a predetermined value.

The terminal makes a call when it receives a radio wave from a base station, in which the statistically stable receiving time is above a predetermined constant time.

The terminal makes a call when it receives a radio wave from a base station, in which the statistically stable receiving time is above a predetermined constant time, in a statistically absolute receiving time.

The terminal makes a call when it receives a radio wave from a statistically receivable base station in an intentionally set absolute time around the same time.

For making a call the terminal subtracts a time having been present in a time range of a base station identification signal being received from the pertinent statistically stable receiving time, and postpones the call making when the difference is below a prescribed value, while making a call when the difference is above the prescribed value.

According to another aspect of the present invention, there is provided an automatic call making system comprising: a plurality of base stations each having a specific identification number and having a cellular structure for transmitting signal in a waiting control channel; and a radio terminal having means for receiving radio waves transmitted from the base stations, a clock, an input electric field intensity level detecting means or a BER detecting means and a means for detecting a base station identification signal, and having a function of tentatively storing data to be transmitted and a function of resuming and continuing communication by automatically doing a line connecting process (call making) when stored data is present; wherein the terminal measures a receiving time, during which stable radio wave reception is possible, for each base station identification signal, stores these times as statistically stable receiving times, stores receiving order combinations of the base stations of the statistically stable receiving times from the absolute times for a base station in which the statistically stable receiving times is above a predetermined time, and when an open line takes place or a line is disconnected during communication in the area in charge of any of the above base stations, waits the reception of a radio wave from the base station to be subsequently received in the basis of the receiving order combinations, and upon reception of the radio wave makes a call to a pertinent base station.

According to other aspect of the present invention there is provided an automatic call making system comprising: a plurality of base stations each having a specific identification number and having a cellular structure for transmitting signal in a waiting control channel; and a radio terminal having means for receiving radio waves transmitted from the base stations, a clock, an input electric field intensity level detecting means or a BER detecting means and a means for detecting a base station identification signal, and having a function of tentatively storing data to be transmitted and a function of resuming and continuing communication by automatically doing a line connecting process (call making) when stored data is present; wherein the terminal receives a waiting control channel which is always transmitted by the base stations, and makes a call when the average value of the input electric field intensity levels exceeds a predetermined value or when the average value of the short times BERs is below a predetermined value and also the degree of separation from the average value of the instantaneous electric field intensity levels in the average time is below a predetermined value.

The terminal postpones the call making for predetermined time when the input electric field intensity level becomes below a predetermined value.

According to still other aspect of the present invention there is provided, in a radio communication system comprising plurality of base stations each having a cellular structure of transmitting a specific identification signal in a waiting control channel; a radio terminal having a means for receiving radio waves transmitted from the base stations and a means for detecting the base station identification signal, and having a function of tentatively storing data to be transmitted and a function of automatically doing a line connecting process (call making) for resuming and continuing communication if stored data is present; and a switching system for doing a hand-over process that the terminal; successively receives radio waves from the plurality of base stations and switching the communication line to the base station of the best electric field intensity; an automatic call making system, in which the switching system predicts the route of the terminal, and when the terminal is handed over from a first base station to a second base station having a transmission/reception allowable time shorter than a predetermined time, forcively disconnects the communication of the second base station with the terminal, in the communication disconnecting process the terminal provides to the terminal a third base station identification signal allowing transmission/reception for more than predetermined time, and when receiving the third identification signal the terminal makes a call to the third base station for resuming the communication.

According to further aspect of the present invention there is provided a mobile radio terminal comprising a means for receiving radio waves from a plurality of base stations each having a cellular structure of transmitting a specific identification signal in a waiting control channel, a clock, an input electric field intensity level detecting means or a BER detecting means and a means for detecting base station identification signals of the plurality of base stations, and having a function of tentatively storing transmitted data and a function of resuming and continuing communication by automatically doing a line connecting process (call making when stored data is present, wherein the terminal includes a means for measuring a stably receivable time for each base station identification signal and storing the measured times as statistically stable receiving times, and a means for making a call to the patient base station on the basis of the statistically stable receiving times.

In the present invention, the terminal estimates a communication time from the quantity of data to be transmitted to make it possible to select the time and place of re-connection trial start with reference to a statistically stable reception time of a base station capable of effecting the transmission and reception.

In the different embodiment of the present invention features that a switching system for controlling base stations forecasts the circumstances of radio communication lines of radio terminals and advises the radio terminal of the identification number of a base station which satisfies the predetermined conditions, and each radio terminal makes an automatic call to the contacted base station from which the identification number of the base station.

Other objects and features will be clarified from the following description with reference to attached drawings.

PREFERRED EMBODIMENTS OF THE INVENTION

Preferred embodiments of the present invention will now be described with reference to the drawings.

Figure 1:
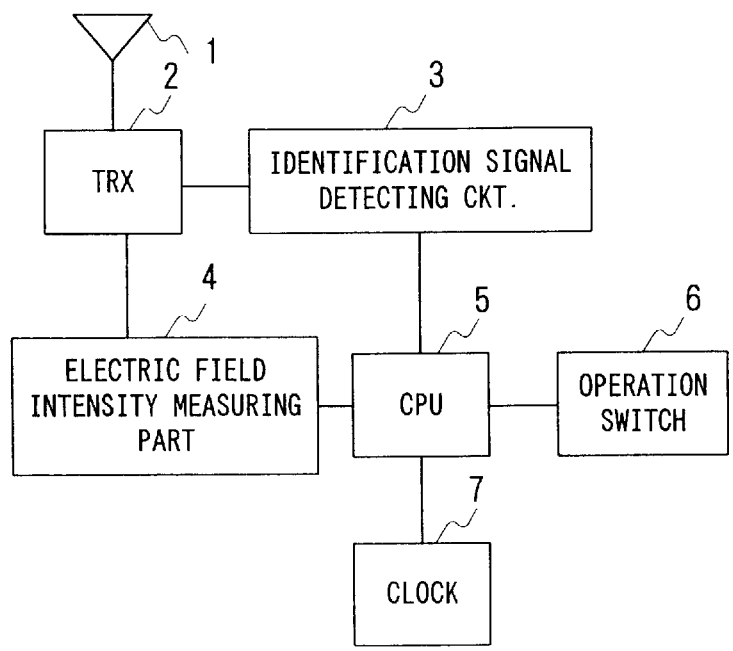
FIG. 1 is a block diagram showing a terminal which constitutes the invention.

FIG. 1 is a block diagram showing a terminal. A radio wave containing an identification signal as prescribed by a standard specification (ARIB STD-27) is transmitted from a base station and is received in a radio unit (TRX) 2 of the terminal. A base station identification signal detecting unit 3 detects the base station from which the radio wave is received, thus permitting judgment in the CPU 5. The input level of the received radio wave and the reception time is determined by an electric field intensity measuring part 4 and a clock 7, respectively.

Figure 2:
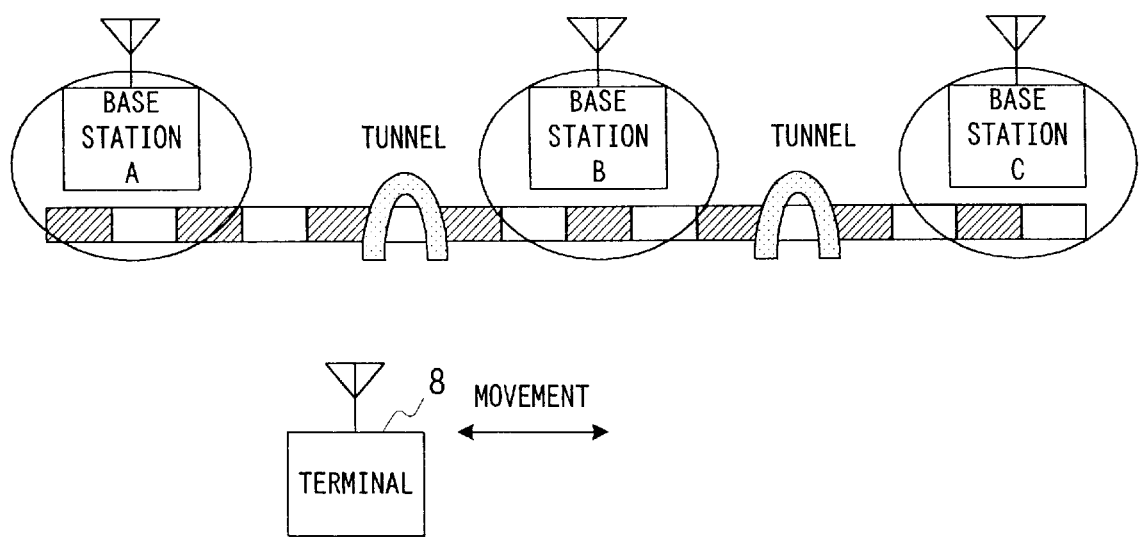
FIG. 2 shows a typical example of circumstances, in which the terminal constituting the present invention is used.

FIG. 2 shows a typical example of circumstances in which the terminal is used. In this example, base stations A to C are located along a railroad, and tunnels M and N intervene between adjacent ones of these base stations. A person with a terminal 8 in the train is assumed to pass through this place while carrying it every morning and evening.

Figures 3, 4:
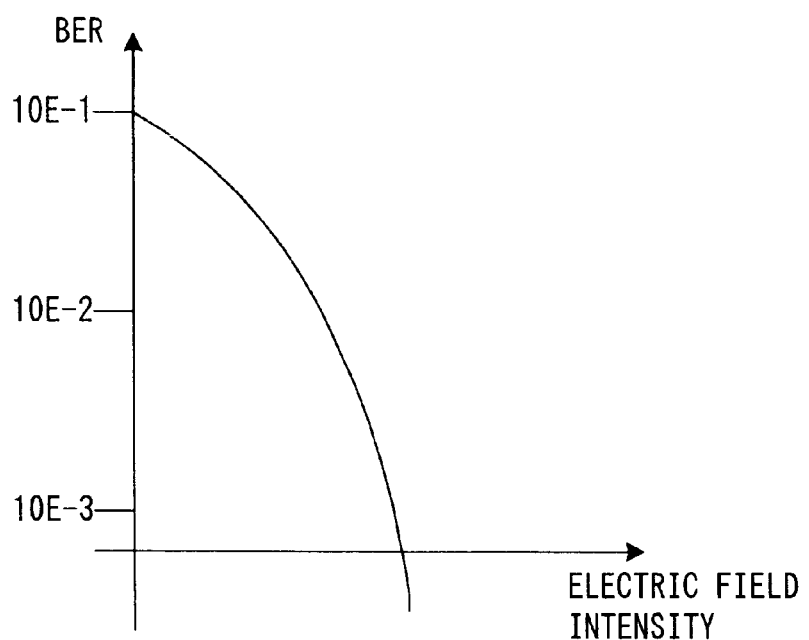
FIG. 3 shows time zones, in which the terminal can receive radio waves from the base stations.
FIG. 4 shows an example of relation between input electric field intensity and data communication quality (bit error rate BER)

FIG. 3 shows time zones, in which the terminal 8 can receive radio waves from the base stations A to C. These time zones are measured from the identification signal and the electric filed intensity data of the signal transmitted from each base station and received in the CPU 5 of the terminal 8 and also from the clock. Thus, in this table, typical values obtained are registered.

When the terminal 8 enters the tunnel M while in communication with the base station A, both the base station A and the terminal 8 start the timers because no radio wave enters the tunnel, and after the lapse of a predetermined time of radio wave interruption a forced line opening process is executed. The prior art terminal makes a recall and reconnects the line as soon as it becomes capable of receiving radio wave from the base station B after clearing a tunnel. However, only a short time is available for receiving a radio wave from the base station B, and the communication is soon interrupted because the terminal enters the other tunnel without taking a sufficient communication time. This requires reconnection of the line by the recall at the place where the terminal can receive the radio wave.

Usually, the line connection requires a radio system connection procedure including an acknowledging procedure or the like. Therefore, a considerable amount of wasted time (of several tens of seconds) is required until the user is ready to receive data providing any content by an upper layer connection procedure such as PPP (Point to Point Protocol). For commencing communication, it is thus the basis of efficient communication necessary for an inexpensive communication fee to avoid as much as possible the circumstances that the user's meaningful data communication is interrupted.

In the case of FIGS. 2 and 3, even when the terminal is ready to receive radio wave from the base station B tentatively, the reconnection should be kept away until the terminal is ready to receive a radio wave from the base station C, which permits stable use of its radio wave for a longer time than base station B. Moreover, if it is a time right before time of 8:10 of entering the tunnel the communication should not be commenced even when a radio wave from the base station A is being received. Accordingly, the terminal 8 has the table shown in FIG. 3 for being able to select the time and place of the connection trial start by forecasting the communication time from the transmission data quantity, thus evading inefficient communication which is liable to be interrupted.

The operation of the present invention will now be described.

Automatic Call Procedure

The terminal 8 periodically sets up a link at a time when and in a place where the conditions are met by referring to the table in FIG. 3, and thus becomes able to exchange data, if any, to be transmitted to the terminal or link destination automatically. If the terminal user selects places in the table for setting up the link and stores the selected places in the CPU 5, the link can be set up when and only when the conditions are met by the time and the place (i.e., base station). For example, when the terminal user passes by the base station A (for instance at time of 8:01), the terminal user stores that time and identification number #A of the base station A being received in the CPU 5 by operating the operation switch 6 in the terminal 8. When the identification number #A of the base station A is received at time of 8:00 every subsequent day, the terminal 8 automatically makes a call to and connects a line to a server, which has been preliminarily registered and is to be accessed for synchronized data processing. The terminal user may store a plurality of times for doing the synchronous data processing in the CPU 5 by operating the operation switch 6 several times a day, and by so doing it is possible to increase the real time property of data, which is effective for the schedule control or the like.

Recall Making

For the recall making, it is effective to have the terminal learn, for instance, a call-making order condition that the resumption of communication with the base station C is allowed in the case of the interruption of communication with the base station A, and conversely, that the resumption of communication with the base station A is allowed in the case of the interruption of communication with the base station C and that no other combination (base station B) is permitted. By so doing, it is possible to obtain stable communication by excluding absolute time conditions of communication with particular base stations. This is attainable by constructing the terminal 8 such that it automatically statistically learns the table shown in FIG. 3, selects the base station providing allowable communication times above a predetermined value and arranges communications therewith in the order of pass times. For example. In the case of the table shown in FIG. 3, with the allowable communication time set to be 5 minutes or above, the base station B is excluded from the communicable candidates, and from the absolute time conditions the base station C adjacent to the base station A is capable of permitting the above control.

Automatic Call Making According to Electric Field Data

The terminal 8 can recognize the status of the radio transmission line from each base station on the basis of the pertinent electric field data of a wait control channel which is always transmitted from the base stations. Usually, the down (from base station to terminal) and up (from terminal to base station) radio lines are substantially in the same circumstances, and the input electric field intensity and the data communication quality (i.e., BER (bit error ratio) of the terminal are in such a relation to each other as shown in FIG. 4. It will be seen that the communication quality is the better the greater the input electric field value.

Figure 5:
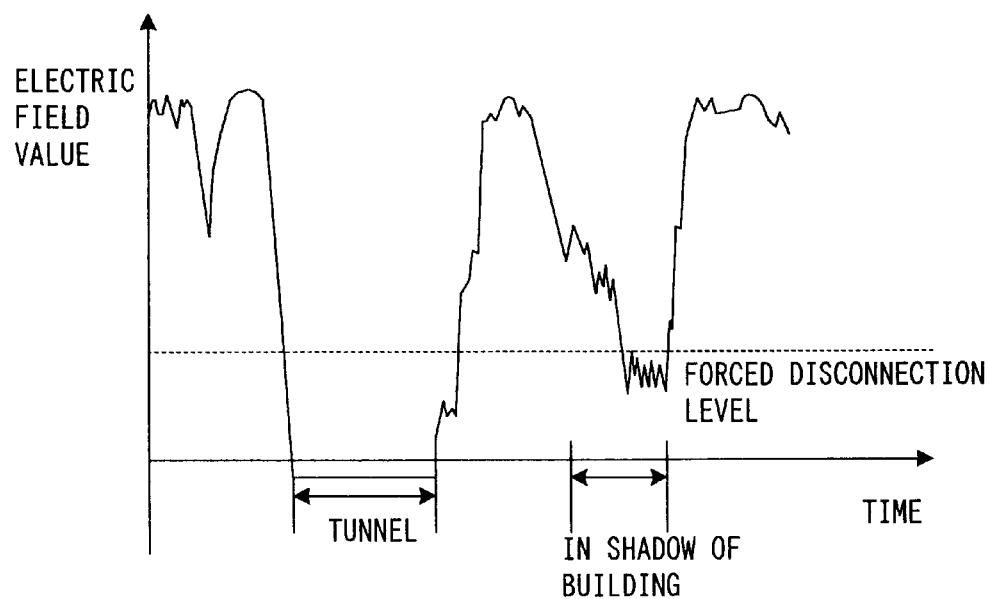
FIG. 5 shows an example of the electric field intensity of the base station wave received by the mobile terminal 8, the electric field intensity being plotted versus time.

FIG. 5 shows an example of the electric field intensity of the base station radio wave received by the mobile terminal 8, the electric field intensity being plotted versus time. In tunnels and inside buildings, the electric field is zero because of no arriving radio wave. In a place where it is difficult for a radio wave to arrive, such as in the shadow of a building, the line quality is insufficient for the communication, although a slight electric field is available. Therefore, the system forcibly disconnects the line if the electric field intensity is below a predetermined level (forced disconnection level) and the line can be restored in a predetermined time. In addition, when the terminal is distant from a base station, the electric field is low in the average, and it is not estimated that restoration is obtainable with movement in a short time. In a further case, in which the electric field intensity varies so greatly that it suddenly becomes zero although its average value is high, it is predicted that the person carrying the terminal enters a subway or a building. In such cases, the resumption of communication should be postponed until the received electric field intensity is stabilized even if it is momentarily increased by the radio wave entering from a window or the like. From the electric field intensity and variations thereof, conditions suitable for making a call are established when the input electric field intensity is high in the average and less subject to momentary variations. It is also prescribed that in such situations when the electric field intensity momentarily becomes zero, no call should be made for a long time until the electric field intensity is stabilized.

Figure 6:
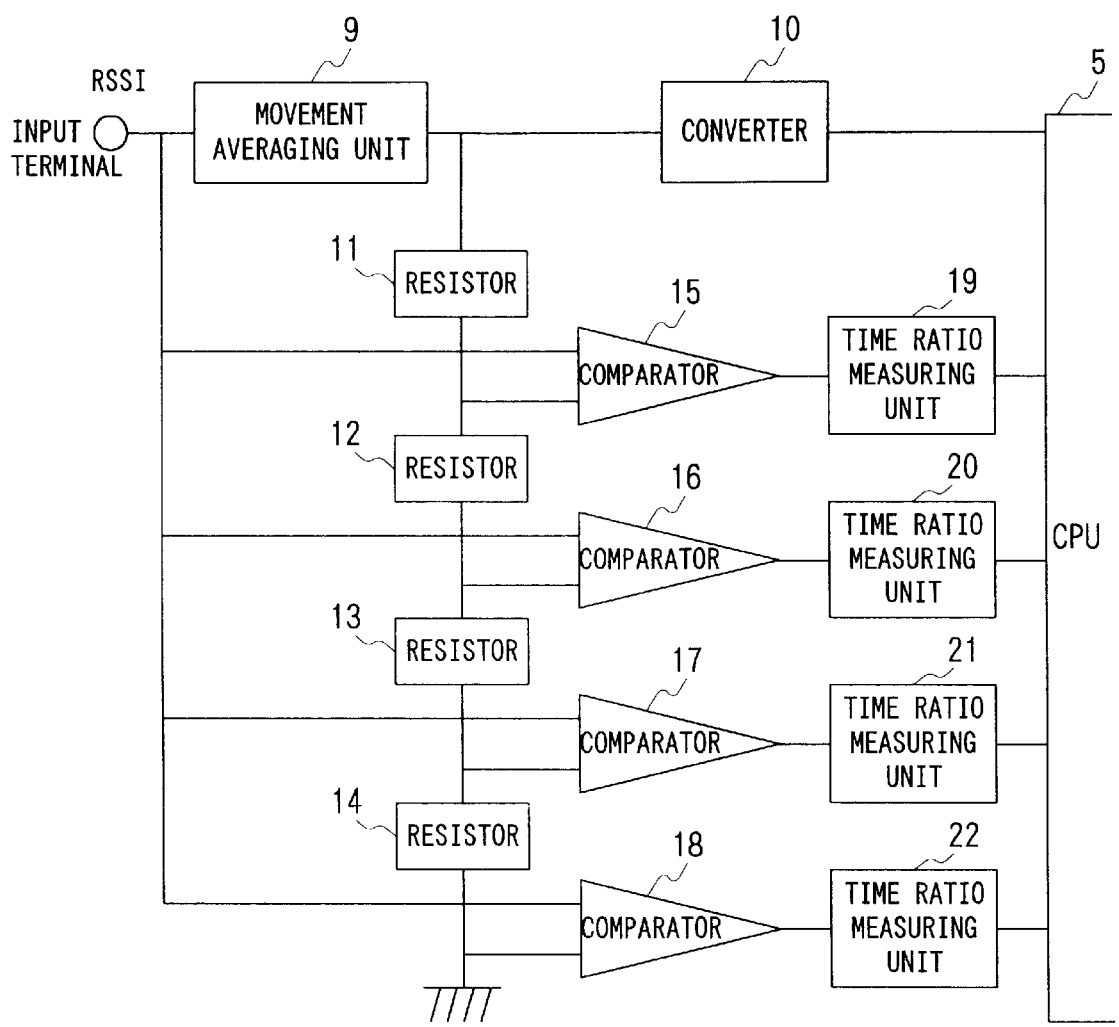
FIG. 6 shows an electric field intensity measuring unit.

As shown in FIG. 6, the terminal 8 includes a movement averaging unit 9 for calculating the average of the inputted electric field intensity signal (RSSI signal) of a radio unit for every periodically input RSSI signal, and comparators 15 to 17 for comparing the RSSI signal with references obtained by multiplying the output of the unit 9 by constant bias values with resistors 11 to 14. The comparators 15 to 17 each generate a time width pulse signal when the RSSI signal level is below the reference. Time ratio measuring units 19 to 21, which are connected to the comparators 15 to 17, respectively, measure the time ratios of the generated time width pulse signals. A further comparator 18, which uses a certain fixed value as reference, and a time ratio measuring unit 22 measures or monitors the RSSI signal. The fixed value is set to an RSSI signal level when the input electric field intensity is almost zero (i.e., zero voltage in FIG. 6).

The outputs of the time ratio measuring units 19 to 22 are inputted as data to and read by the CPU 5. The output of the movement averaging unit 9 is converted in an A/D converter 10 to digital data and, likewise, is inputted to and read by the CPU 5. The CPU 5 can then make a call when the average input electric field intensity exceeds a certain predetermined value. Also, the momentary intensity variation is measured for detecting more stable line circumstances.

Figure 7:
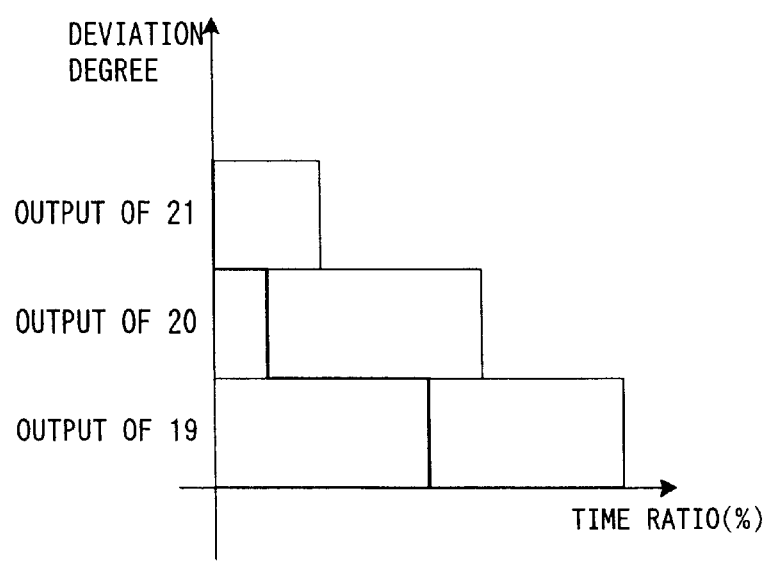
FIG. 7 shows an example of relation between the measured values by the electric field intensity measuring unit and conditions for making call.

FIG. 7 shows the outputs of the time ratio measuring units 19 to 21 at a certain time read out by the CPU 5. For the comparators 15 to 17, the references are set by the resistors 11 to 14 such that the deviations from the average value are progressively greater. The time ratio values outputted by the time ratio measuring units 19 to 21 show degrees of momentary variations. The less the outputs of the time ratio measuring units 20 and 21 compared to the output of the time ratio measuring unit 19, the more the line is stable. Accordingly, prescribed values shown in FIG. 7 for base station A, which are smaller in order of the time ratio measuring units from 19 to 21, are provided, and at a condition wherein it is possible to make a call because the output of each comparator is below the pertinent prescribed value. The output of the time ratio measuring unit 22 represents the time ratio when the input electric field is substantially zero. If this value is measured, the call making ability is postponed for a period of time until the above call making conditions are reestablished.

In such a radio system as ARIB Standard STD-27F, the switching system for controlling the base stations is performing a hand-over process of switching the communication line to the optimum base station according to received electric field data of the terminal 8 received by the base station during the communication. The switching system preliminarily has intelligence of the locations of the base stations. Thus, as the line to the terminal 8 is switched, the terminal 8 becomes able to readily predict circumstances such as entering a tunnel. In such a case, after switching the line from the terminal 8 over to the base station right before the tunnel, the switching system forcively discontinues the communication, and during this procedure the base station transmits an identification signal to the terminal 8, thereby enabling the terminal 8 to make a call. Subsequently, the terminal 8 detects the identification number of the base station, and makes an automatic call to connect the line to that base station.

As has been described in the foregoing, according to the present invention in radio data communication the circumstances of the radio communication line are statistically learned to allow making an automatic call when prescribed conditions are met. It is thus possible to effectively connect a line without relying on vague experience or intuition of the person. In addition, in such circumstances wherein the line can be held only for a short period of time, a wasteful connecting operation can be avoided, thus permitting economical and efficiency communication.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An automatic call making system comprising:
    a plurality of base stations each having a specific identification number and having a cellular structure for transmitting a signal in a waiting control channel; and
    a radio terminal having means for receiving the signals transmitted from the plurality of base stations, a clock and a means for detecting each base station identification number, and having a function of tentatively storing data to be transmitted and a function of resuming and continuing communication by automatically carrying out a line connecting process when stored data is present, wherein:
        the terminal measures a receiving time, during which stable radio wave reception is possible for each base station signal, stores these receiving times as statistically stable receiving times, and makes a call to one of the plurality of base stations on the basis of the statistically stable receiving times,
        for making a call the terminal subtracts a time during which the terminal has been present in the statistically stable receiving time of the base station signal, and postpones the call making when the difference is below a prescribed value, while making a call when the difference is above the prescribed value.

2. An automatic call making system comprising:
    a plurality of base stations each having a specific identification number and having a cellular structure for transmitting signals in a waiting control channel; and
    a radio terminal having means for receiving the signals transmitted from the plurality of base stations, a clock and a means for detecting the base station identification numbers, and having a function of tentatively storing data to be transmitted and a function of resuming and continuing communication by automatically doing a line connecting process when stored data is present; wherein:
        the terminal measures a receiving time, during which stable radio wave reception is possible for each base station signal, stores these times as statistically stable receiving times, stores receiving order combinations of the base stations based on a period that the statistically stable receiving times for each of the plurality of base stations is above a predetermined time, and when communication between the terminal and one of the plurality of base stations takes place, the terminal awaits reception of the signal from the base station to be subsequently received on the basis of the receiving order combinations, and upon reception of the signal makes a call to the base station of the subsequently received signal.

3. An automatic call making system comprising:
    a plurality of base stations each having a specific identification number and having a cellular structure for transmitting signals in a waiting control channel; and
    a radio terminal having means for receiving the signals transmitted from the base stations, a clock, an input electric field intensity level detecting means or a BER detecting means and means for detecting the base station identification number, and having a function of tentatively storing data to be transmitted and a function of resuming and continuing communication by automatically doing a line connecting process when stored data is present; wherein:
        the terminal receives a waiting control channel which is always transmitted by the base stations, and makes a call when an average value of input electric field intensity levels from one of the plurality of base stations exceeds an electric field predetermined value or when an average value of the BERs is below a BER predetermined value and when the degree of separation between the average value of the input electric field intensity levels of consecutive base stations of the plurality of base stations are below each other.

4. The automatic call making system according to claim 3, wherein the terminal postpones the call making for a predetermined time when the input electric field intensity level is below the electric field predetermined value.

5. In a radio communication system comprising:
    a plurality of base stations each having a cellular structure for transmitting a specific identification signal in a waiting control channel;

a radio terminal having a means for receiving radio waves transmitted from the base stations and a means for detecting the base station identification signal, and having a function of tentatively storing data to be transmitted and a function of automatically doing a line connecting process for resuming and continuing communication if stored data is present; and a switching system for predicting the route of the terminal and doing a hand-over process for the terminal as the terminal successively receives the radio waves from the plurality of base stations by switching a communication line of the terminal to the base station of the best electric field intensity;

an automatic call making system that, when the terminal is handed over from a first base station to a second base station having a transmission/reception allowable time shorter than a predetermined time, forcively disconnects the communication of the second base station with the terminal, and in the communication disconnecting process provides to the terminal a third base station identification signal allowing transmission/reception for more than the predetermined time, and when receiving the third identification signal the terminal makes a call to the third base station to resume communication.

6. A communication system comprising:

a plurality of base stations, each of the plurality of base stations transmitting an electromagnetic signal that defines a communication area; and a terminal unit operable to communicate with the plurality of the base stations, measure an average reception time that the terminal unit is present in the communication area of each of the plurality of the base stations and initiate communication with a base station of the plurality of the base stations as a function of the average reception time, wherein the terminal unit is further operable to prevent communication with the base station when the difference between the amount of time the terminal unit has been present in the communication area and the average reception time of the base station is below a prescribed value.

* * * * *